(12) United States Patent
Dai

(10) Patent No.: US 6,565,242 B2
(45) Date of Patent: May 20, 2003

(54) WHEEL WITH SOUND AND LIGHT EFFECTS

(76) Inventor: Jen Hao Dai, No. 11, Lane 11, Chang Kuo Rd., Chung Li, Tao Yuan Hsien (TW)

( * ) Notice: Subject to any disclaimer, the term of this patent is extended or adjusted under 35 U.S.C. 154(b) by 0 days.

(21) Appl. No.: 09/871,953

(22) Filed: Jun. 4, 2001

(65) Prior Publication Data

US 2002/0181242 A1 Dec. 5, 2002

(51) Int. Cl.[7] ................................................. B60Q 1/00
(52) U.S. Cl. ........................ 362/500; 362/86; 362/192; 362/473
(58) Field of Search ................................ 362/500, 192, 362/543, 473, 253, 86

(56) References Cited

U.S. PATENT DOCUMENTS

| | | | | |
|---|---|---|---|---|
| 4,648,610 A | * | 3/1987 | Hegyi | 362/192 |
| 4,775,919 A | * | 10/1988 | Pearsall et al. | 362/500 |
| 5,536,074 A | * | 7/1996 | Hsu et al. | 362/500 |
| 5,584,561 A | * | 12/1996 | Lahos | 362/192 |
| 5,590,946 A | * | 1/1997 | Jung | 362/192 |
| 5,779,344 A | * | 7/1998 | Tseng | 362/86 |
| 5,873,600 A | * | 2/1999 | Conway | 362/192 |
| 6,116,763 A | * | 9/2000 | King | 362/500 |

* cited by examiner

Primary Examiner—Sandra O'Shea
Assistant Examiner—Peggy A Neils

(57) ABSTRACT

A wheel with sound and light effects includes a fork for supporting a wheel, a magnetic element, and a plurality of lamps. A plurality of lamps are installed at the spoke of a wheel. Each lamp is installed with a magnetic receiving element made by winding a coil. Each magnetic receiving element is connected to a capacitor and a light emitting element. Two outer sides of the rim each are installed with a magnetic element and are locked to the fork. Thereby, a rotating wheel may light up in the whole cycle as it rotates.

4 Claims, 7 Drawing Sheets

WHEEL WITH SOUND AND LIGHT EFFECTS

FIELD OF THE INVENTION

The present invention relates to a wheel with sound and light effects, wherein a plurality of lamps are installed at the spoke of a wheel. Each lamp is installed with a magnetic receiving element made by winding a coil. Each magnetic receiving element is connected to a capacitor and a light emitting element. Two outer sides of the rim each are installed with a magnetic element and are locked to the fork.

BACKGROUND OF THE INVENTION

The U.S. patent Ser. No. 09/383,441, "Activating device for light—emitting wheel", referring to FIGS. 1 and 2, discloses a wheel with sound and light effects, which comprises the following components.

A wheel body 30 includes a hub 31, a plurality of spokes 32, and a rim 33. The hub 31 is installed at a center of the wheel body 30. The plurality of spokes 32 are firmly secured to the outer periphery of the hub 31. The rim 33 is firmly secured to the periphery of the plurality of spokes 32.

A sound light generating element 40 is firmly secured to the internal of the spoke 32 and includes a selective touch moving device 41 with proper wires therein, a sound element 42 and at least one battery 43. The touch moving device 41 includes a housing 414, two conductive pieces 412 and a touch moving element 413. The housing is installed with an upper cover 414. The two conductive pieces 412 have the same structure and the bottoms thereof are tilt and curved. The condutive pieces are firmly secured to the housing 411, so that the two guide pieces are face to one another and the bottoms thereof are left with a proper distance. Then, a touch moving element 413 is two conductive pieces 412 and then an upper cover 414 covers thereon.

A plurality of light emitting element 50 are firmly secured to the rim 33.

A plurality of electric wires 60 are connected to the plurality of light emitting element 50 and the sound light generating element 40.

Thereby, as the wheel body 30 rotates, the touch moving element 413 will roll out by eccentric force, so that the two conductive pieces 412 will conductive and then battery 43 supplies power, so that each light emitting element 50 lights up.

However, the aforesaid structure is only suitable for a small wheel, skate wheel, not suitable for the wheel of a large car. The circuit of the wheel with sound and light effects must have a battery as power supply so as to generate sound and light effects as the wheel is rotated. If no battery or power, then this effect will not work.

SUMMARY OF THE INVENTION

Accordingly, the primary object of the present invention is to provide a wheel with sound and light effects for improving U.S. patent U.S. Ser. No. 09/383,441, wherein the wheel with sound and light effects includes a fork for supporting a wheel, a magnetic element, and a plurality of lamps. A plurality of lamps are installed at the spoke of a wheel. Each lamp is installed with a magnetic receiving element made by winding a coil. Each magnetic receiving element is connected to a capacitor and a light emitting element. Two outer sides of the rim each are installed with a magnetic element and are locked to the fork. Thereby, a rotating wheel may light up in the whole cycle as rotation.

Another object of the present invention is to provide a wheel with sound and light effects, a rotating wheel may light up in the whole cycle as rotation even no power is supplied from a battery.

The various objects and advantages of the present invention will be more readily understood from the following detailed description when read in conjunction with the appended drawing.

DETAILED DESCRIPTION OF THE PREFERRED EMBODIMENTS

Figure 1:
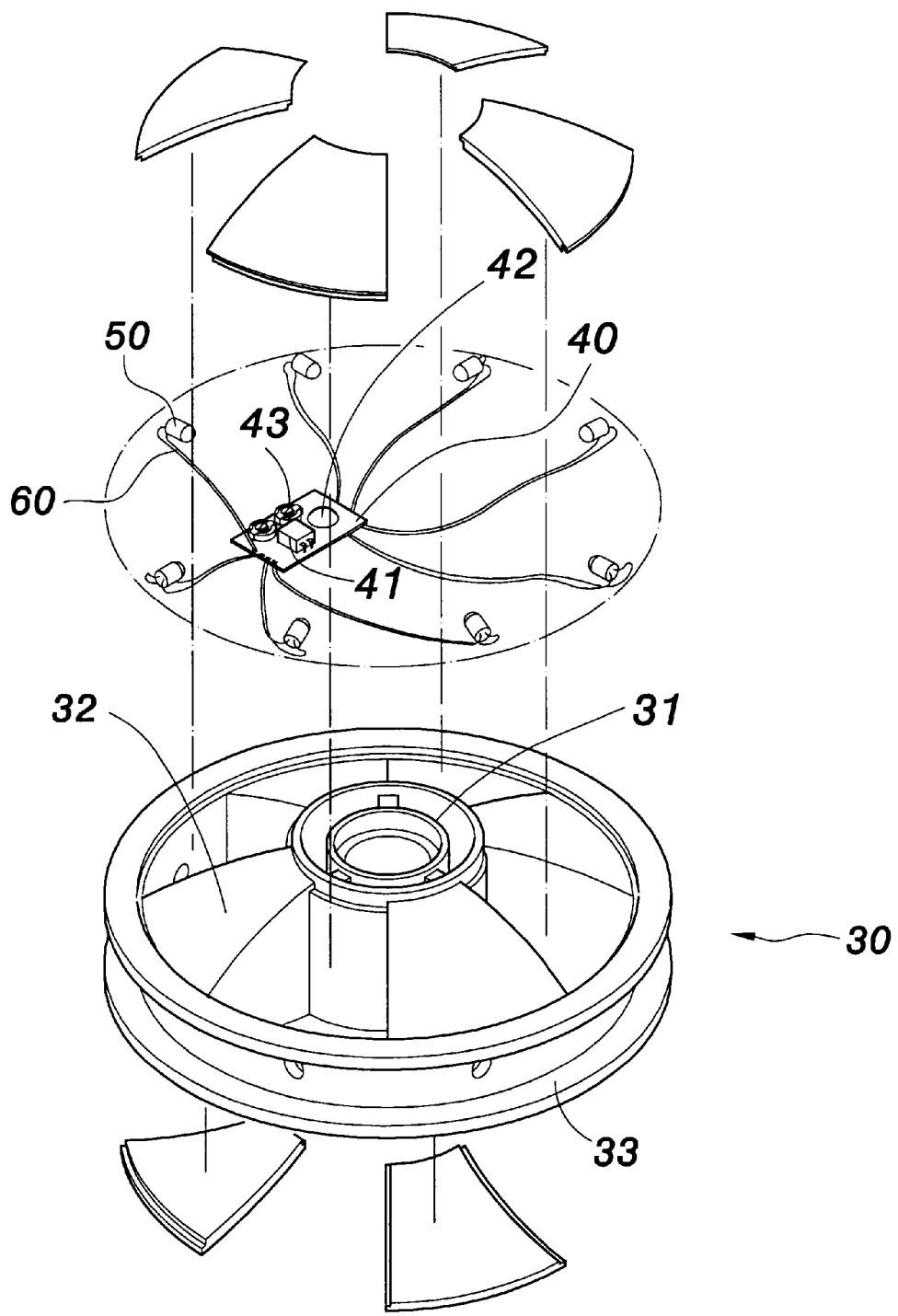
FIG. 1 is an exploded perspective view of the prior art.
Figure 2:
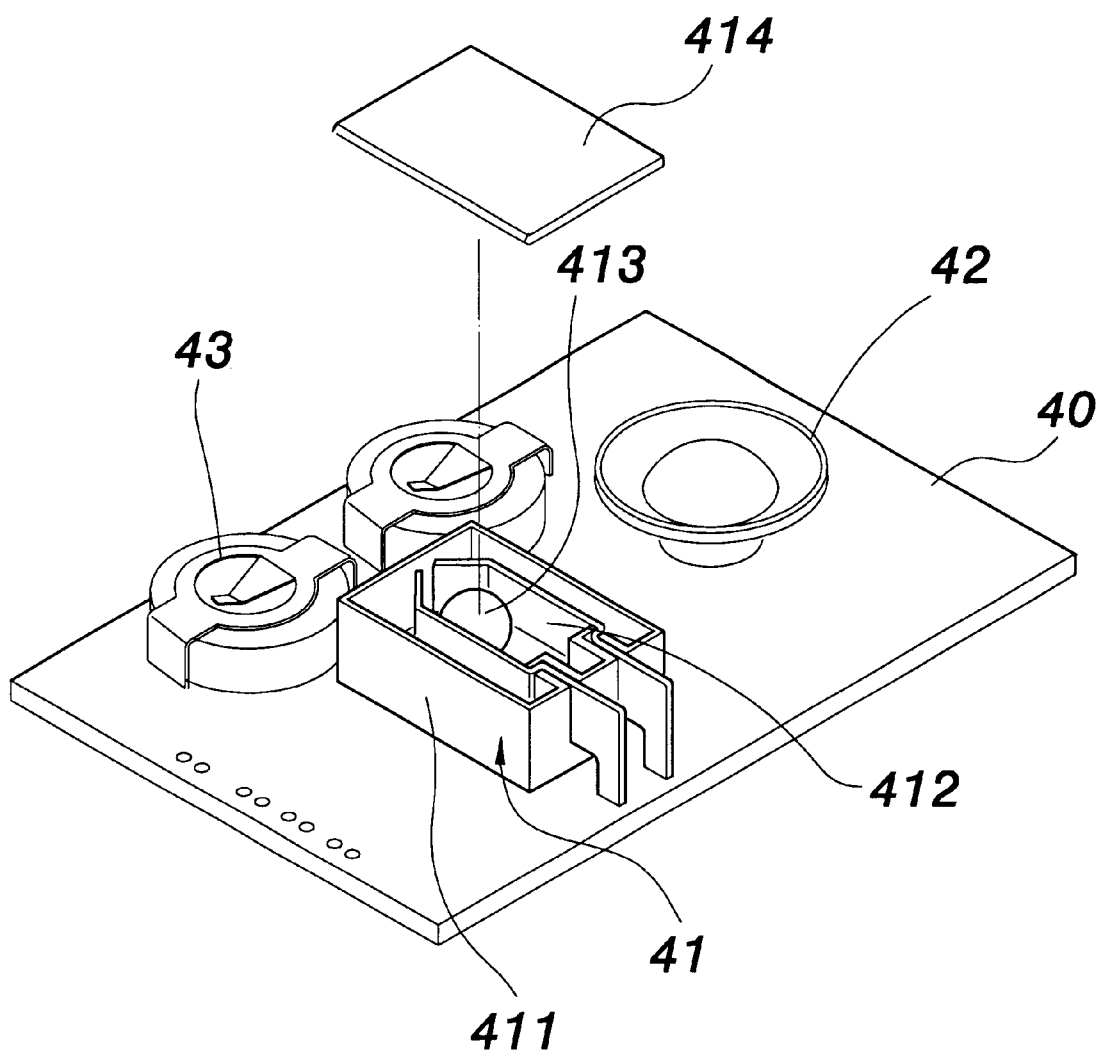
FIG. 2 is a schematic view showing the sound light generating element of FIG. 1.
Figure 3:
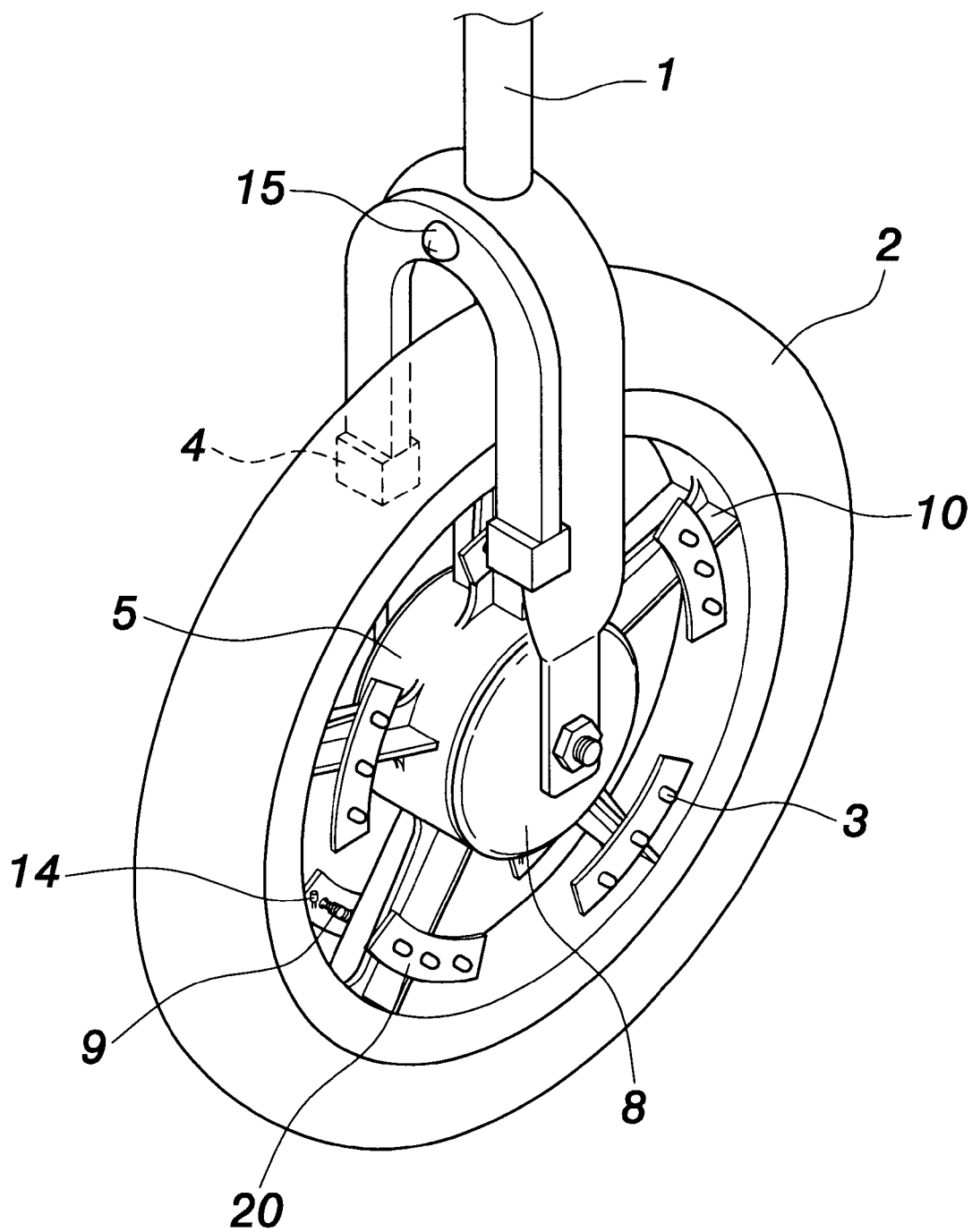
FIG. 3 is an assembled view of the present invention.
Figure 4:
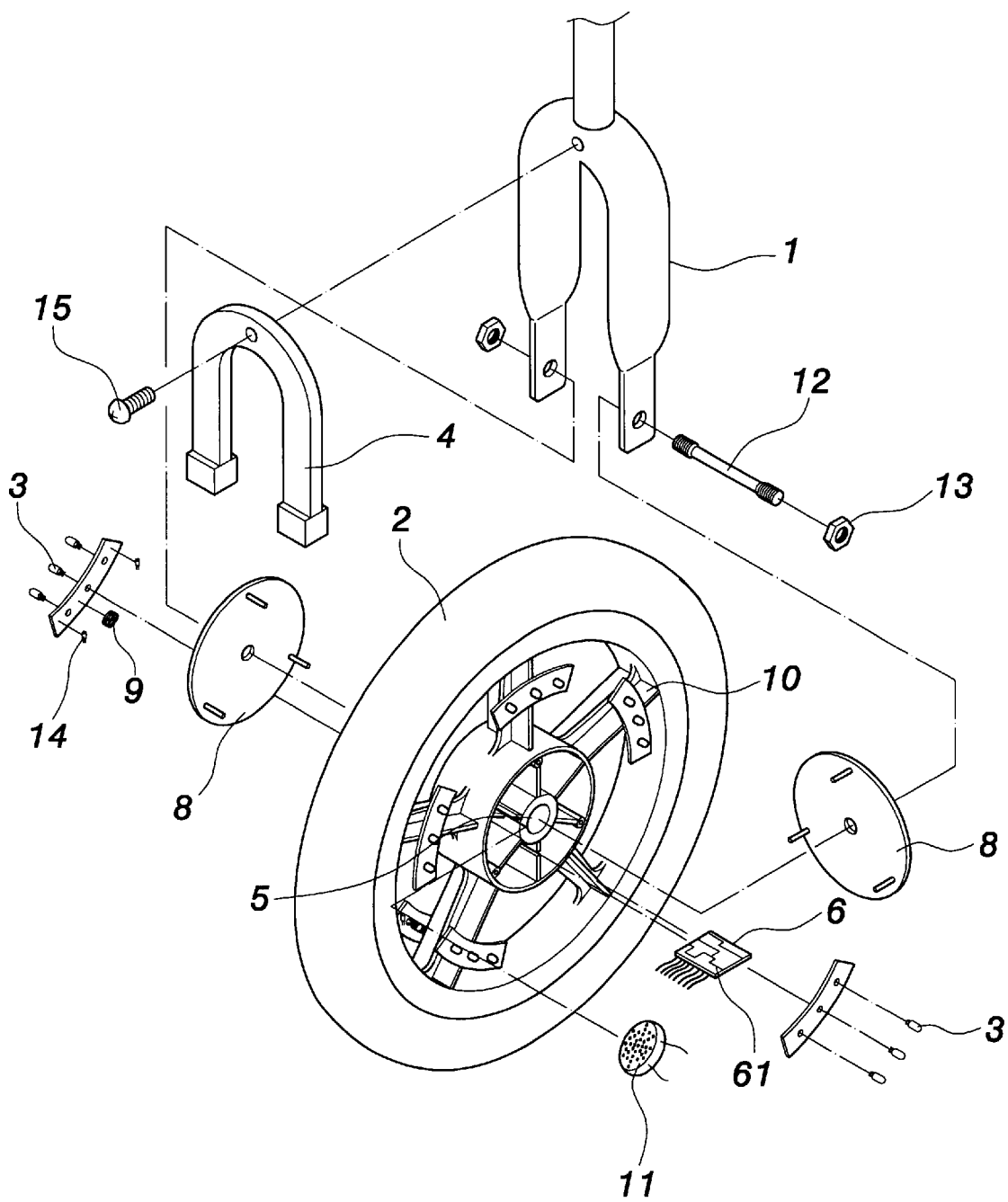
FIG. 4 is an exploded perspective view of the present invention.
Figure 5:
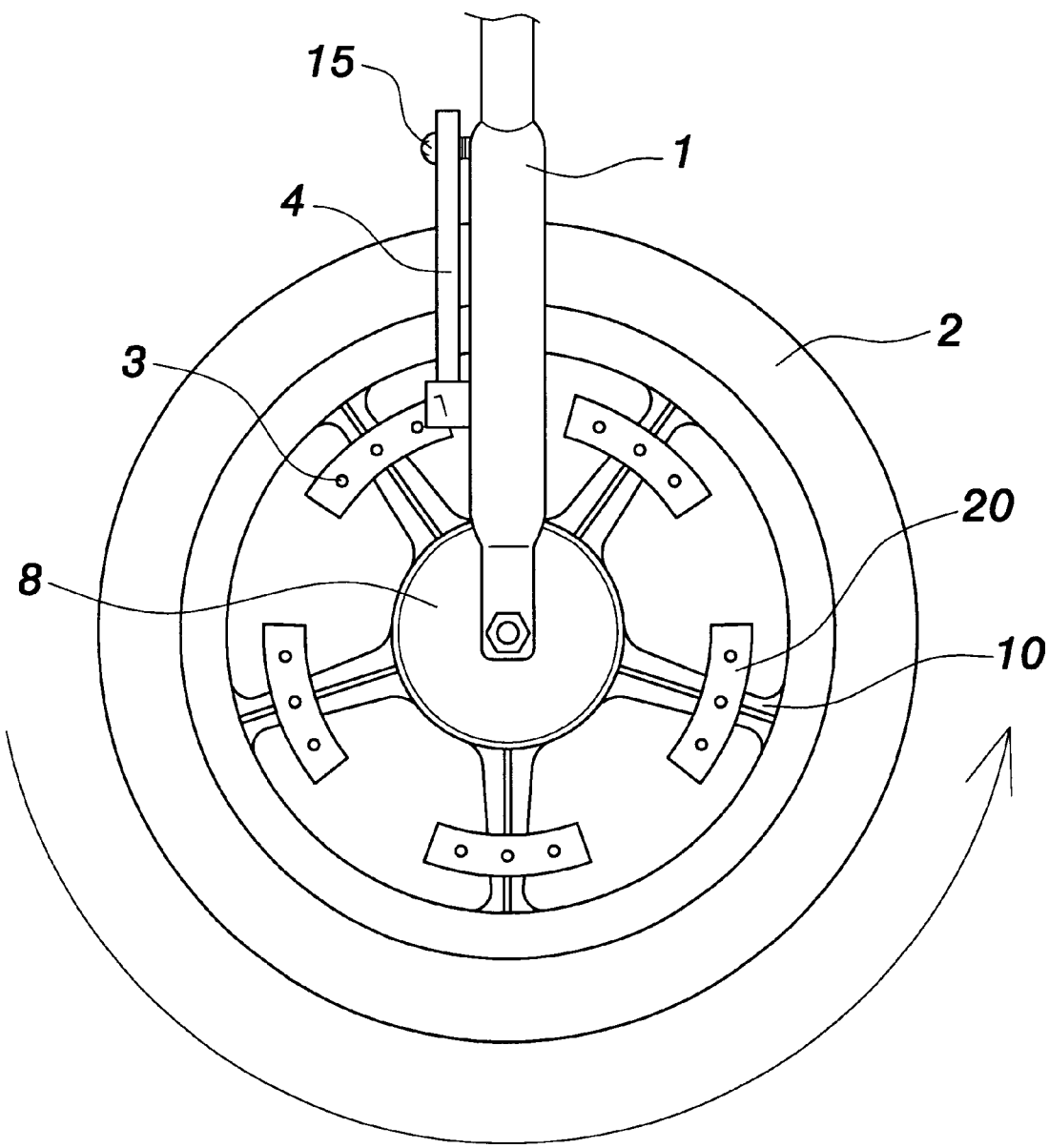
FIGS. 5 and 6 shows one embodiment of the present invention.
Figure 6:
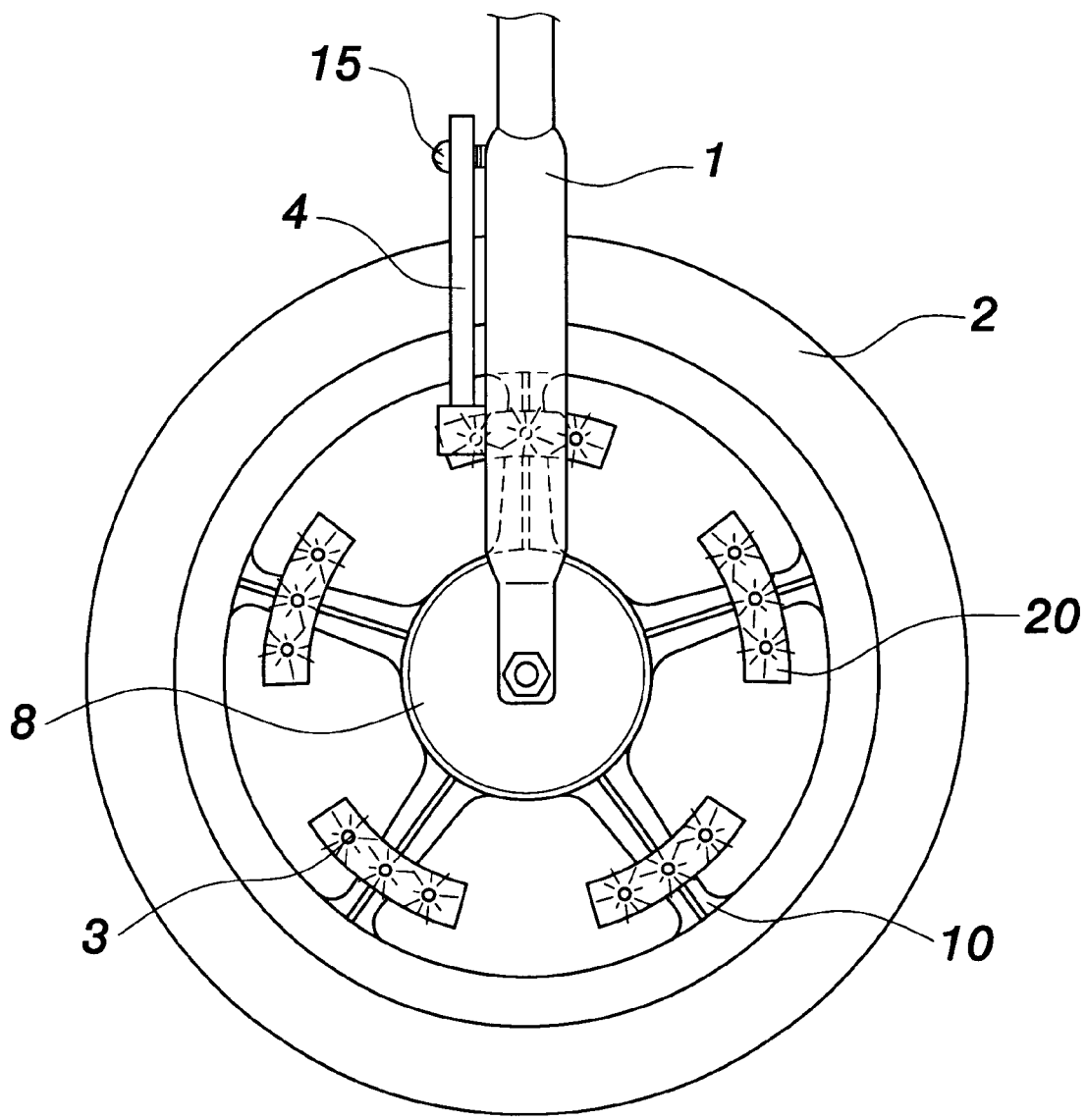

Referring to FIGS. 3 to 6, the wheel with sound and light effects of the present invention is illustrated. The bicycle wheel with sound and light effects includes a wheel body, being formed by a hub 5, a spoke 10 and a rim 2, etc., a magnetic element 4, a working circuit board 6, and a plurality of lamps 20.

The two sides of the hub 5 each are installed with a cover 8. The two outer sides of the cover 8 are installed with forks 1 for supporting the wheel body and are penetrated by a wheel shaft 12. Two screws 13 are combined to outer lateral sides of the forks 1, so that the two forks 1, cover 8 and hub 5 are combined as an integral body. The periphery of the hub 5 is circularly installed with a plurality of spokes 10 each of which is retained with a selected distance. The end portions of the spokes 10 is circular installed with a rim 2.

The magnetic element 4 has a reverse U shape and is installed to two outer sides of the rim 2, which are locked together by a screw 15 and a fork 1.

The working circuit board 6 is installed to a hub 5. A sound light generating element 61 is installed on the working circuit board 6. The output of the sound light generating element 61 is connected to a sound element 11 and a light emitting element 3.

A plurality of lamps 20 are installed to the rim 2. Each lamp 20 is installed with a magnetic receiving element 9 which is formed by winding a coil. The magnetic receiving element 9 is connected to a capacitor 14, the light emitting element 3, and the sound light generating element 61. The magnetic receiving element 9 will generate electric signal so as to conduct power to a circuit. Thereby, the light emitting element 3 will light up and sound light generating element 61 works.

When the wheel body rotates, the lamps 20 are driven to rotate. After each magnetic receiving element 9 passes through the magnetic element 4 to cut the magnetic force lines, induced electromotive force occurs to drive the light emitting element 3 to light up. After lamp 20 passes through the magnetic element 4 completely, then the capacitor 14 of the lamp 20 will access the induced electromotive force. The induced electric power is sufficient for the wheel body to rotate through one cycle. Therefore, by four or five light emitting elements 3, a rotating wheel may light up in the whole cycle as rotation.

Figure 7:
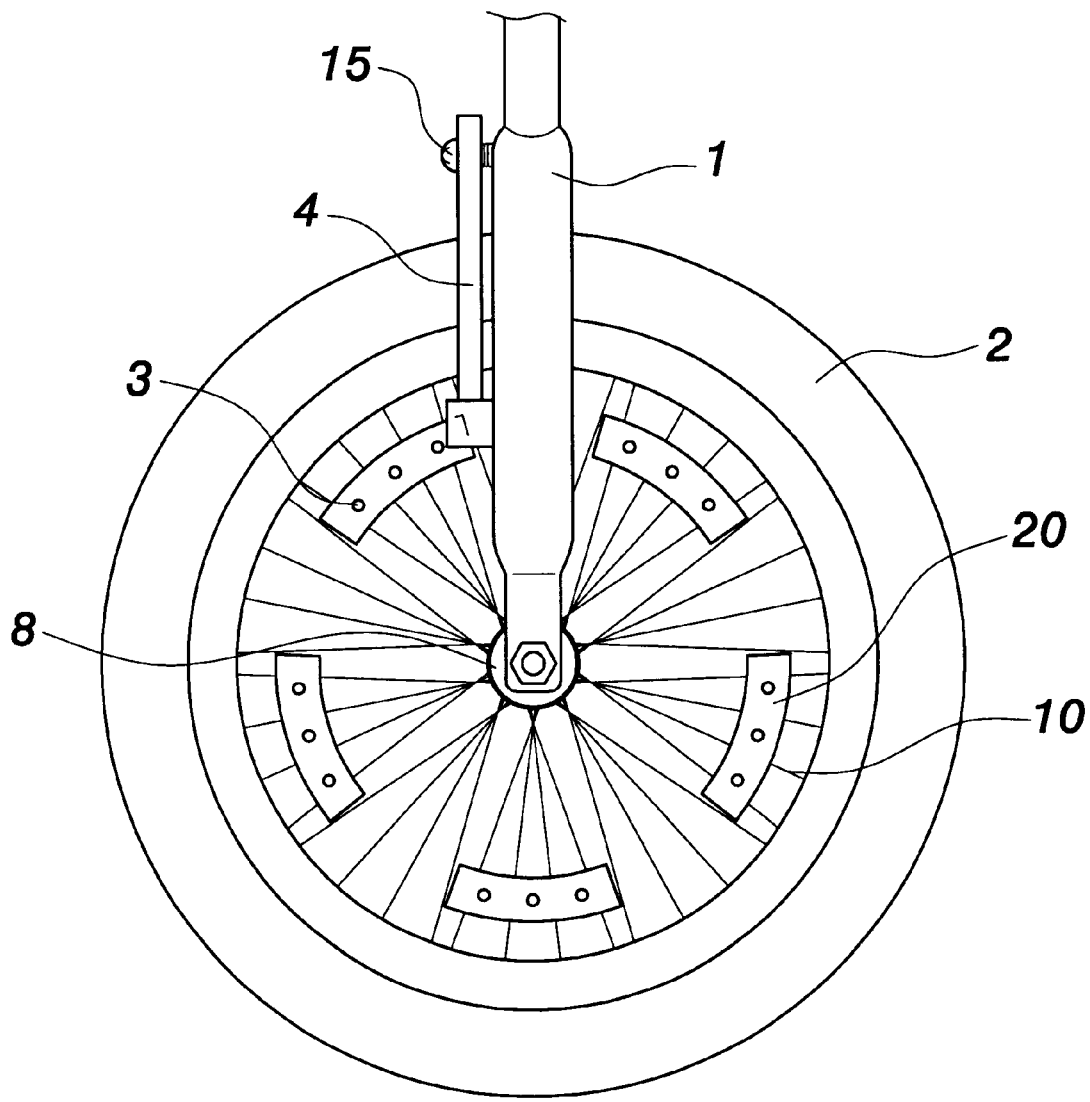
FIG. 7 shows another embodiment of the present invention.

Referring to FIG. 7, an embodiment that the present invention is applied to a bicycle wheel. A plurality of lamps 20 are installed to the spoke 10 of the wheel body. Each lamp 20 is installed with a magnetic receiving element 9 formed by winding a coil. Each magnetic receiving element 9 is connected to the capacitor 14 and light emitting element 3. Two outer sides of the rim 2 are installed with a magnetic element 4 which are locked to a fork 1. Therefore, by four or five light emitting elements 3, a rotating wheel may light up as rotation.

Therefore, the wheel with sound and light effects of the present invention may be used to the wheels of other vehicle, so that as no power is supplied from a battery, a rotating wheel may light up in the whole cycle as rotation.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wheel with sound and light effects comprising:
    a wheel body having a hub, each of two sides of the hub being mounted with a fork for supporting the wheel body and a plurality of spokes being extended from a periphery of the hub and being spaced with a predetermined distance; and a circular rim being connected to one end portion of each spoke; characterized in that:
    a plurality of lamps being installed to the rim; each lamp being installed with a magnetic receiving element which is formed by winding a coil; the magnetic receiving element being connected to a capacitor; and a light emitting element; and
    a magnetic element being installed to two outer sides of the rim; which is locked together as a fork;
    when the wheel body rotates; the lamps are driven to rotate; after each magnetic receiving element passes through the magnetic element to cut the magnetic force lines; electromotive force is induced in the coil and drives the light emitting element to light up; after the lamp passes through the magnetic element completely; then the capacitor of the lamp will access an induced electromotive force; induced electric power is sufficient for the light emitting elements to light up as the wheel rotates through one cycle.

2. The wheel with sound and light effects as claim in claim 1, wherein a sound light generating element is mounted to the hub of the wheel body, the sound light generating element is connected to the magnetic receiving element; the sound light generating element is connected to a sound element and the light emitting element.

3. The wheel with sound and light effects as claim in claim 1, wherein the magnetic element is locked to the fork of the supporting wheel by screw.

4. The wheel with sound and light effects as claim in claim 1, wherein the magnetic element has a reverse U-shape.

* * * * *